(12) United States Patent
Bernard

(10) Patent No.: US 6,450,458 B1
(45) Date of Patent: Sep. 17, 2002

(54) CABLE DUCT COUPLER WITH LOCKING CLIP

(75) Inventor: William A. Bernard, Darien, IL (US)

(73) Assignee: Panduit Corp., Tinley Park, IL (US)

( * ) Notice: Subject to any disclaimer, the term of this patent is extended or adjusted under 35 U.S.C. 154(b) by 65 days.

(21) Appl. No.: 09/585,699

(22) Filed: Jun. 1, 2000

(51) Int. Cl.$^7$ ................................................. F16L 3/22
(52) U.S. Cl. ...................... 248/68.1; 403/387; 403/122; 52/11; 52/220.5
(58) Field of Search ................................ 403/387, 300, 403/375, 341, 302, 309, 363, 402, 122; 248/49, 48.1, 68.1; 52/11, 220.5

(56) References Cited

U.S. PATENT DOCUMENTS

| | | | |
|---|---|---|---|
| 1,682,840 A | * | 9/1928 | Foerch, Jr. ................. 248/68.1 |
| 1,862,433 A | | 6/1932 | Ross |
| 3,042,351 A | | 7/1962 | DuBois |
| 3,275,355 A | * | 9/1966 | Endler et al. .......... 287/189.36 |
| 3,351,699 A | | 11/1967 | Merckle |
| 3,906,146 A | | 9/1975 | Taylor |
| 4,163,572 A | | 8/1979 | Benscoter |
| 4,305,236 A | | 12/1981 | Williams |
| 4,306,109 A | | 12/1981 | Nattel |
| 4,931,597 A | | 6/1990 | Kimbrough et al. |
| 4,954,015 A | | 9/1990 | McGowan |
| 5,035,092 A | | 7/1991 | Brant |
| 5,038,528 A | | 8/1991 | Brant |
| 5,067,678 A | | 11/1991 | Henneberger et al. |
| D347,209 S | * | 5/1994 | Henneberger .............. 248/68.1 |
| 5,316,243 A | | 5/1994 | Henneberger |
| 5,391,840 A | | 2/1995 | Hughes et al. |
| 5,752,781 A | | 5/1998 | Haataja et al. |

FOREIGN PATENT DOCUMENTS

EP  0 315 023 A2  5/1989

* cited by examiner

Primary Examiner—Kimberly T. Wood
(74) Attorney, Agent, or Firm—Robert A. McCann; Jay A. Saltzman

(57) ABSTRACT

A cable duct coupler includes an inner wall shaped to define a cable-receiving channel therebetween, a support rib extending from the inner wall and including at least one mount clip, an axially extending outer wall outwardly spaced from the inner wall to define a duct section receiving space therebetween, and at least one removable retention clip. The retention clip has arms that extend into the duct section receiving space, such that upon insertion of cable duct sections, such as a cable trough or fitting, into the duct section receiving space, the retention clip biases the duct sections against the inner wall to retain the duct sections together. The removable retention clip is movable between an insert position in which the arms extend into the duct section receiving space to allow coupling and a detach position in which the arms no longer extend into the duct section receiving space to allow disassembly of the discrete duct sections. The retention clip is formed of a resilient material such as metal and may be bent to form arms that are angled towards the support rib of the duct coupler. The arms may be sharpened or serrated at an edge thereof to increase retention of the duct section with the coupler. With this invention, an attachment end of a duct element, such as a trough or fitting, is able to be relatively easily slid in one direction into the duct receiving space and constrained by the inner and outer walls. However, the retention clips provide a retention force acting on the attachment ends of the duct elements that resist undesired disassembly of the duct element from the coupler in an opposite direction. However, disassembly, when necessary, can be achieved easily by removal of the retention clip, such as by unscrewing.

20 Claims, 7 Drawing Sheets

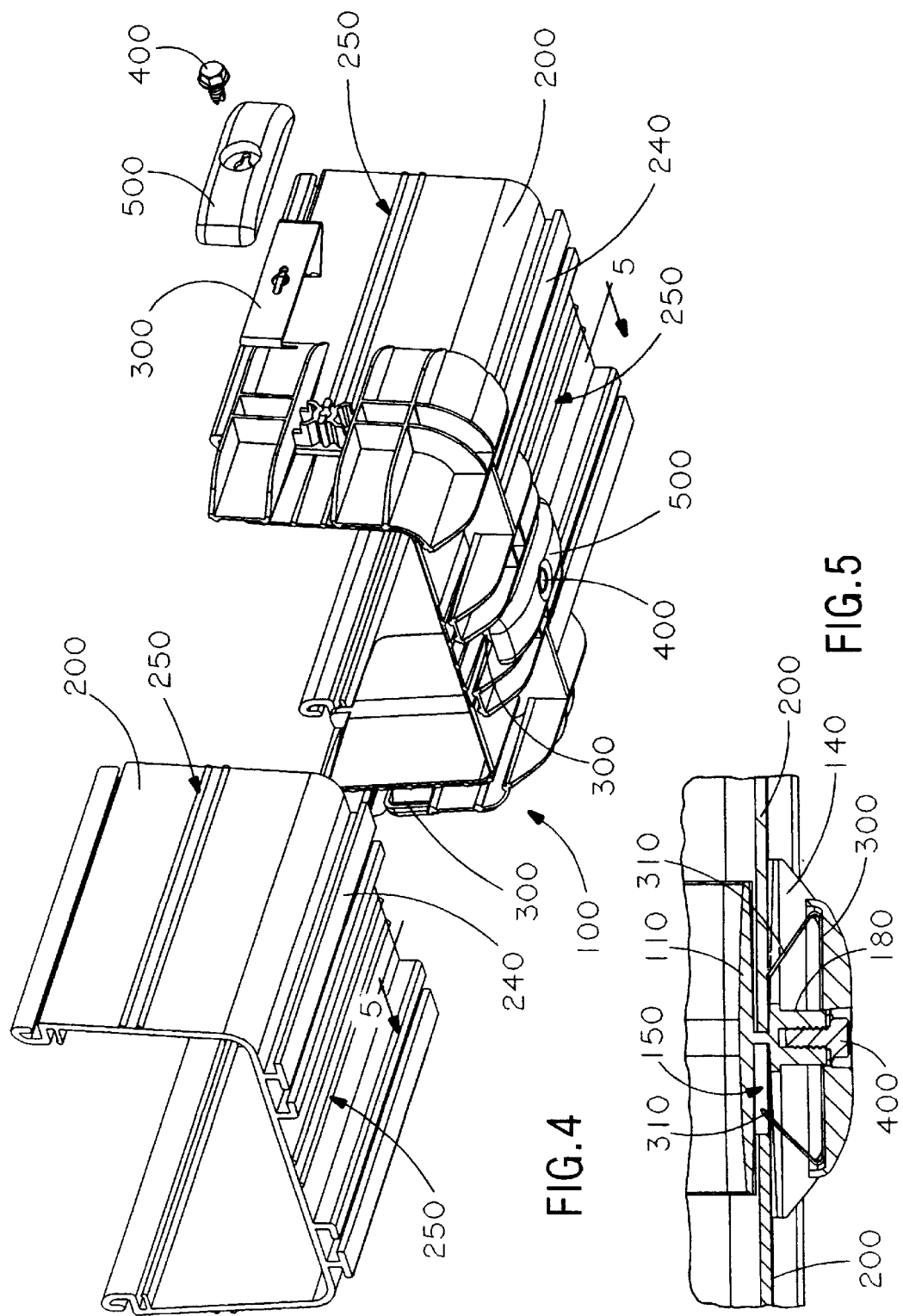

CABLE DUCT COUPLER WITH LOCKING CLIP

BACKGROUND THE INVENTION

1. Field of Invention

The invention relates to a coupler for coupling cable duct sections. More particularly, the invention relates to a coupler that allows quick assembly using a locking retention clip without the need for tools.

2. Description of Related Art

Raceway and duct systems have become very popular in recent years to route, protect and conceal data, voice, video, fiber-optic and/or power cabling. Such systems allow custom installation and can be provided within walls or more preferably provided on external surfaces, allowing ready access for reconfiguration, repair, or installation of additional equipment. Such systems can include various sections of duct or raceway, including straight sections, 90 degree corner fittings, 45 degree corner fittings, T fittings, four-way intersections (X) fittings, and the like, which are affixed together by way of a duct coupler.

SUMMARY OF THE INVENTION

While commercial duct systems exist, there is a need for such a system to be more easily configured.

There also is a need for an improved duct coupler that can easily and reliably couple discrete sections of duct elements, such as troughs or fittings, with minimal or no tools.

There further is a need for such a system and coupler that allows relatively easy disassembly.

The invention has been made to satisfy the above needs and objects and provides a cable raceway duct coupler for a cable duct system. The system includes a cable raceway duct coupler that joins various discrete cable raceway duct sections, which can be either troughs or fittings, and a retention clip that locks and retains the duct sections against the coupler. The cable raceway duct is readily customizable for placement within building walls or provided as a surface mount system to route, protect and conceal data, voice, video, fiber-optic and/or power cabling.

In particular, the invention relates to a cable duct coupler comprising: an inner wall shaped to define a cable-receiving channel therebetween, the inner wall having a predefined axial length between forward and rearward edges; a support rib outwardly extending from the inner wall, the support rib being substantially centrally disposed between the forward and rearward edges of the inner wall, the support rib including at least one clip mount; an axially extending outer wall formed on the support rib, the axially extending outer wall being outwardly spaced from the inner wall by a predefined distance to define a duct section receiving space therebetween; and at least one removable retention clip matable with the clip mount through an open space provided in the outer wall, said retention clip having arms that extend into the duct section receiving space, wherein upon insertion of duct sections into the duct section receiving space, the at least one retention clip biases the duct sections against the inner wall to retain the duct sections together.

The cable duct coupler may have an axially extending outer wall formed from a plurality of discrete outer wall portions to form the open space therebetween. A retention clip may be provided at one or more of the open spaces.

The removable retention clip is movable between an insert position in which the arms extend into the duct section receiving space to allow coupling and a detach position in which the arms no longer extend into the duct section receiving space to allow disassembly of the discrete duct sections.

The retention clip is formed of a resilient material and is preferably bent to form arms that are angled towards the support rib of the duct coupler. This resilient material is preferably metal. The arms may be sharpened or serrated at an edge thereof to increase retention of the duct section with the coupler.

With this invention, an attachment end of a duct element, such as a trough or fitting, is able to be relatively easily slid in one direction into the duct receiving space and constrained by the inner and outer walls. However, the retention clips provide a retention force acting on the attachment ends of the duct elements that resist undesired disassembly of the duct element from the coupler in an opposite direction. However, disassembly, when necessary, can be achieved easily by removal of the retention clip, such as by unscrewing.

The invention also relates to a cable duct system including the cable duct coupler and one or more cable duct sections, which can be fittings or troughs. In such a system, the retention clips are preferably pre-installed at least partially into the clip mounts of the cable duct coupler.

BRIEF DESCRIPTION OF THE DRAWINGS

The foregoing and further objects, features and advantages of the present invention will become apparent from the following description of preferred embodiments with reference to the accompanying drawings, wherein:

FIG. 4 is an exploded view of a cable raceway duct system according to a second embodiment of the invention;

FIG. 5 is a cross-sectional view of a duct retention barb member affixed to the duct coupler used to bias and retain the discrete sections of cable raceway duct within the coupler.

DETAILED DESCRIPTION OF PREFERRED EMBODIMENTS

Figure 1:
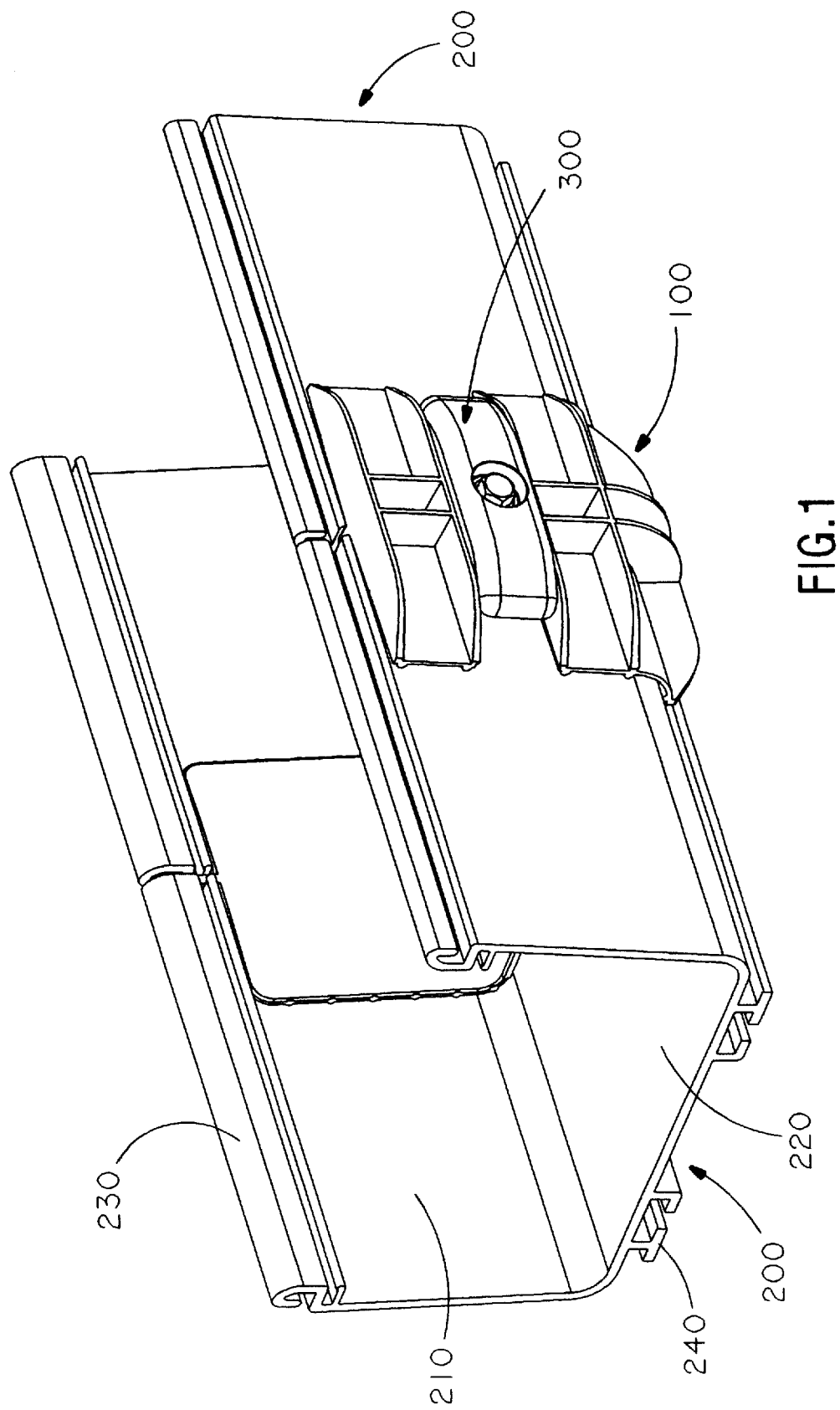
FIG. 1 is a perspective view of a cable raceway duct coupler according to the invention coupling two discrete sections of cable raceway duct.

A first embodiment of a cable raceway duct system according to the invention will be described with reference to FIGS. 1–3. The system includes a cable raceway duct coupler 100 that joins various discrete cable raceway duct sections 200, which can take the form of straight raceway trough sections as shown or various cable raceway duct fittings as shown in FIGS. 6–13, and a retention clip 300 that retains and locks the duct sections against the coupler 100.

Figure 2:
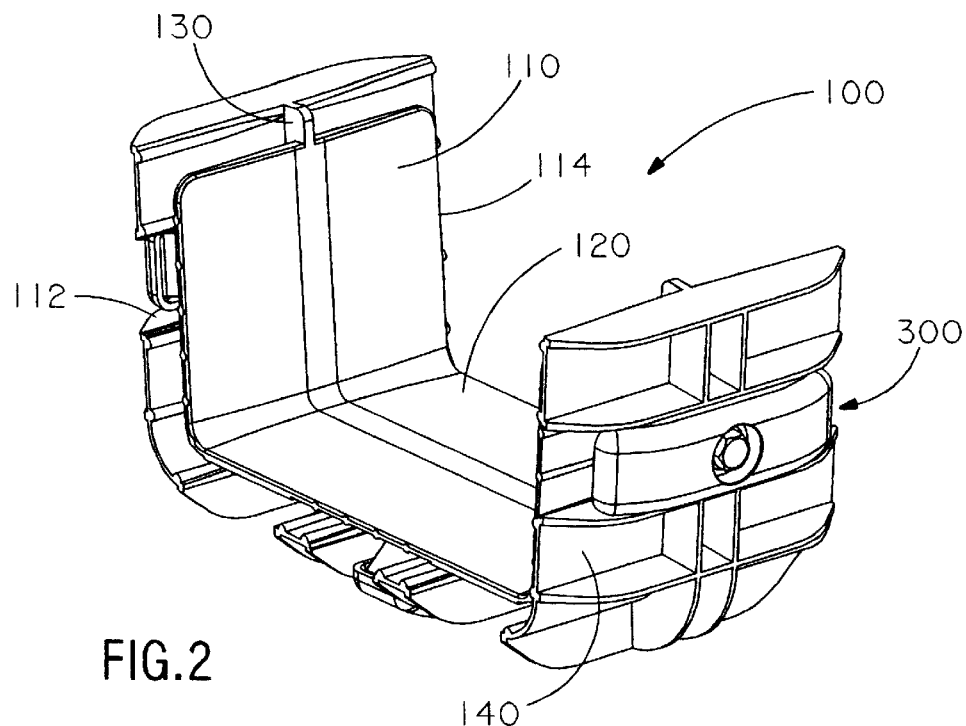
FIG. 2 is a perspective view of the cable raceway duct coupler of FIG. 1.
Figure 3:
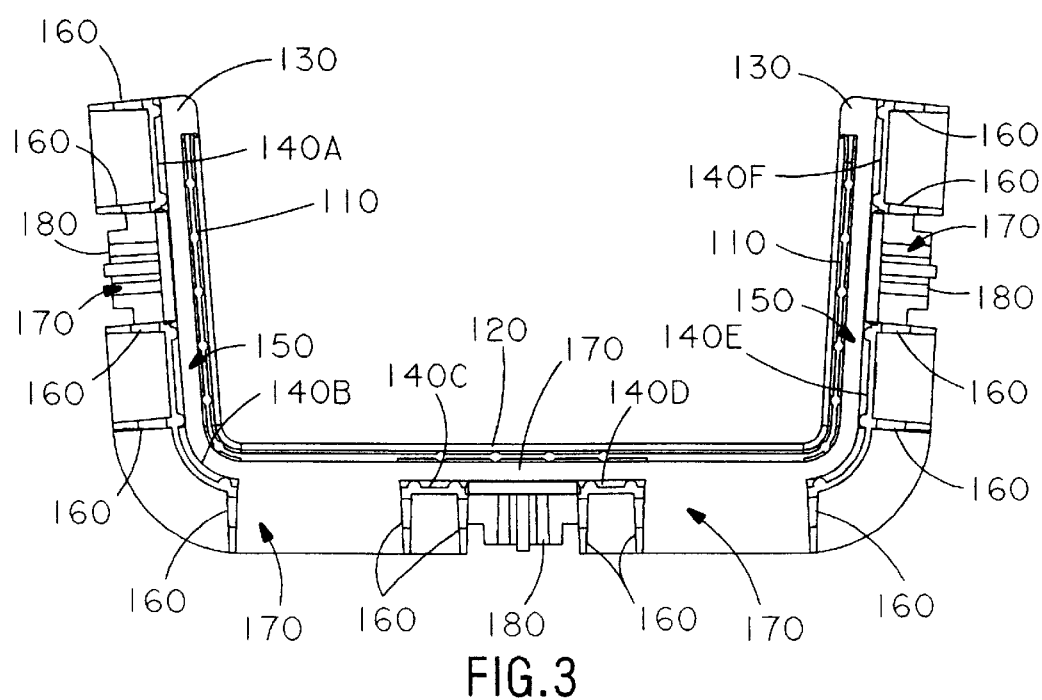
FIG. 3 is an end view of the cable raceway duct coupler of FIG. 1.
Figure 6:
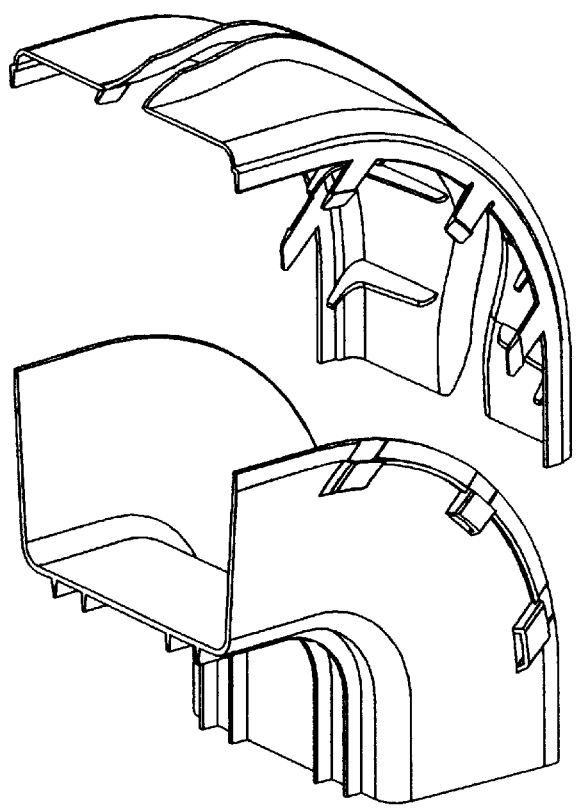
FIGS. 6–13 show various cable duct fittings that can also be affixed to each other or to a cable raceway duct by the cable raceway duct coupler.
Figure 7:
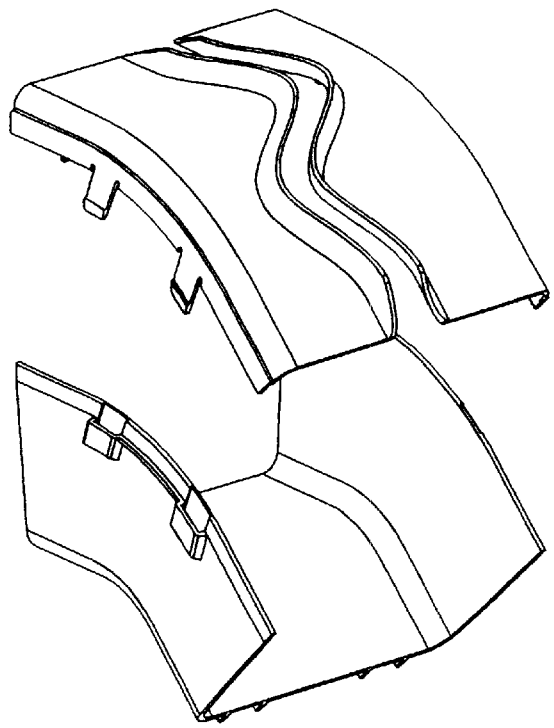
Figure 8:
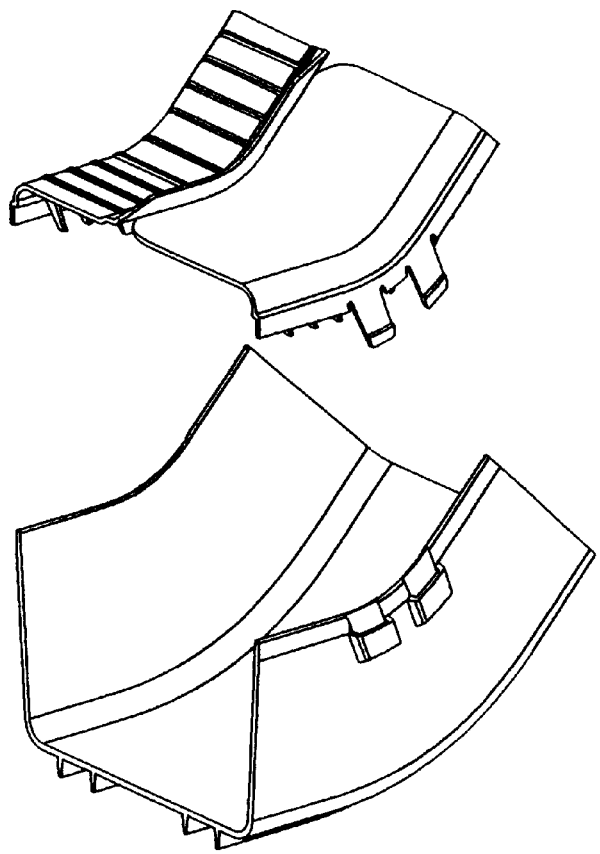
Figure 9:
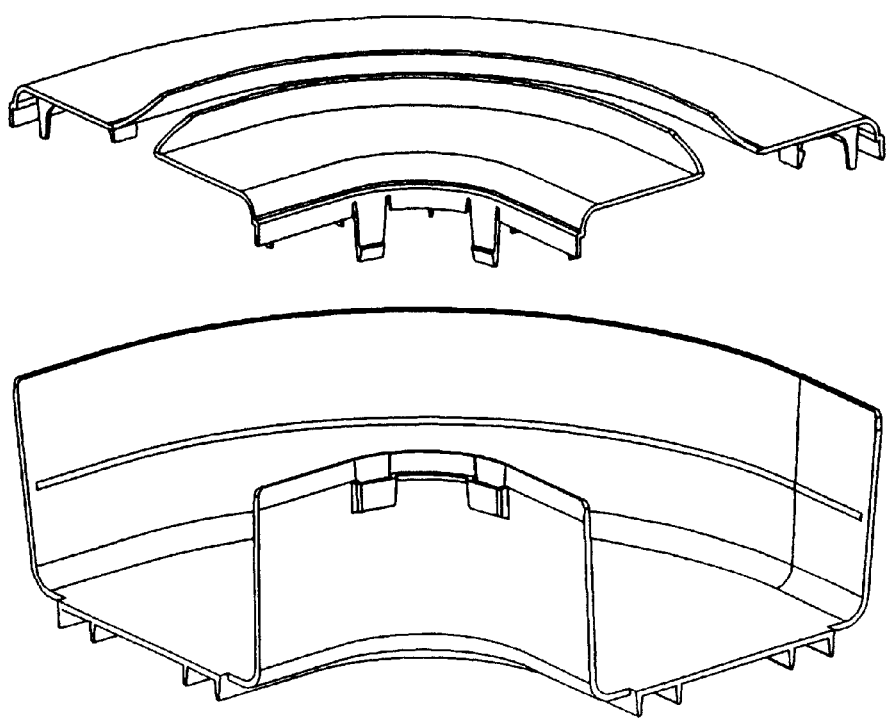
Figure 10:
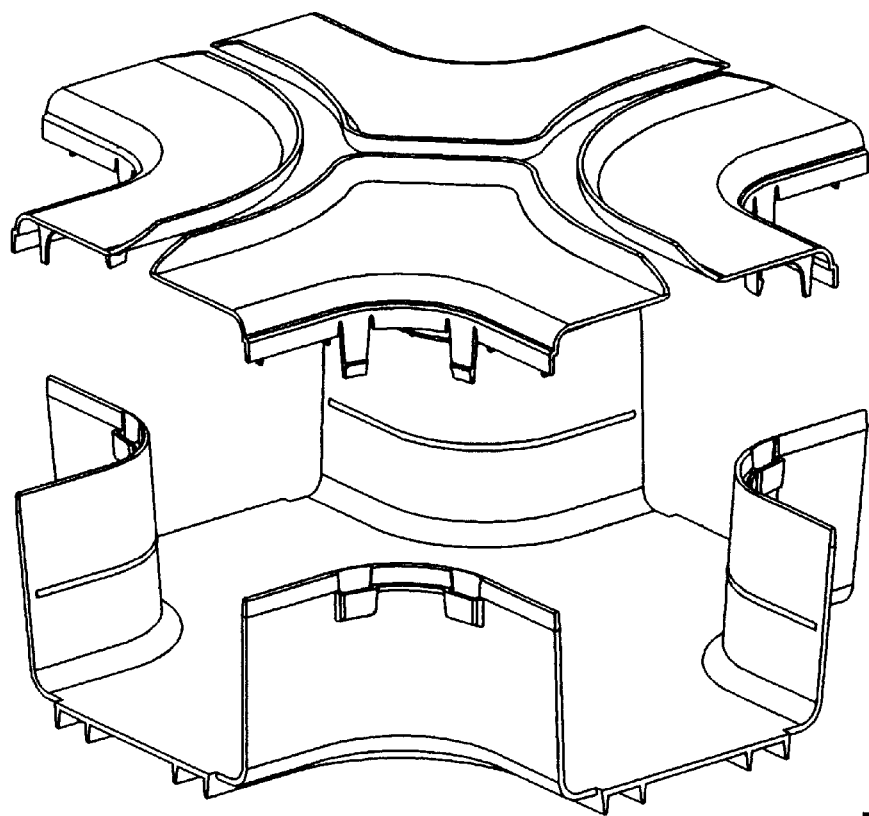
Figure 11:
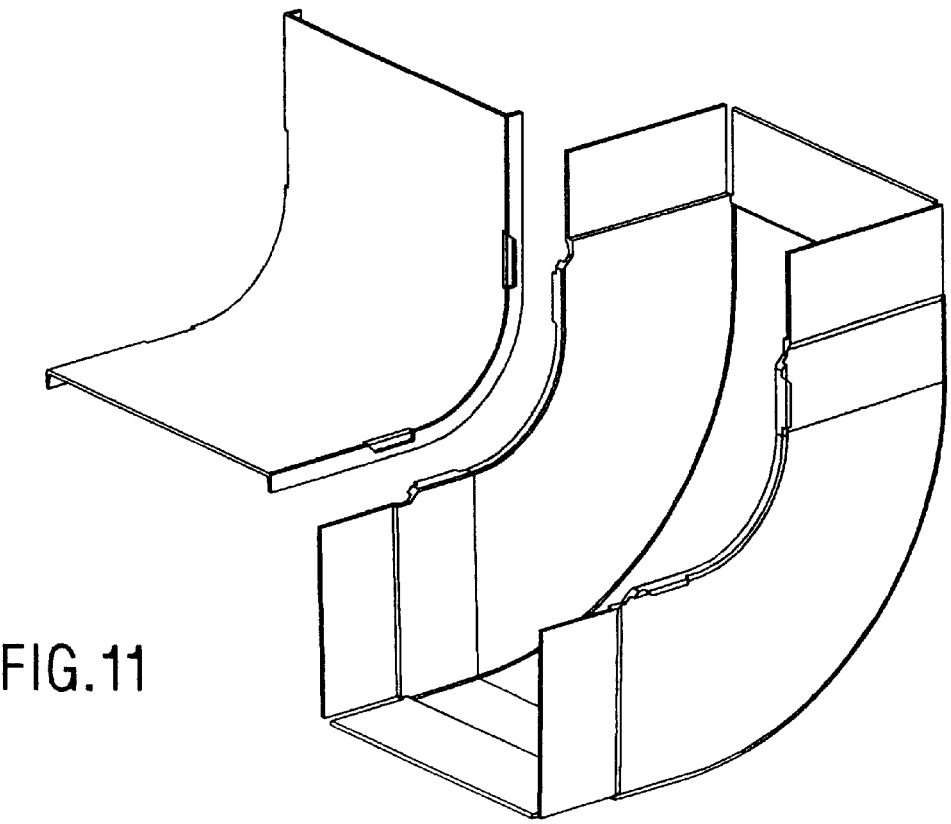
Figure 12:
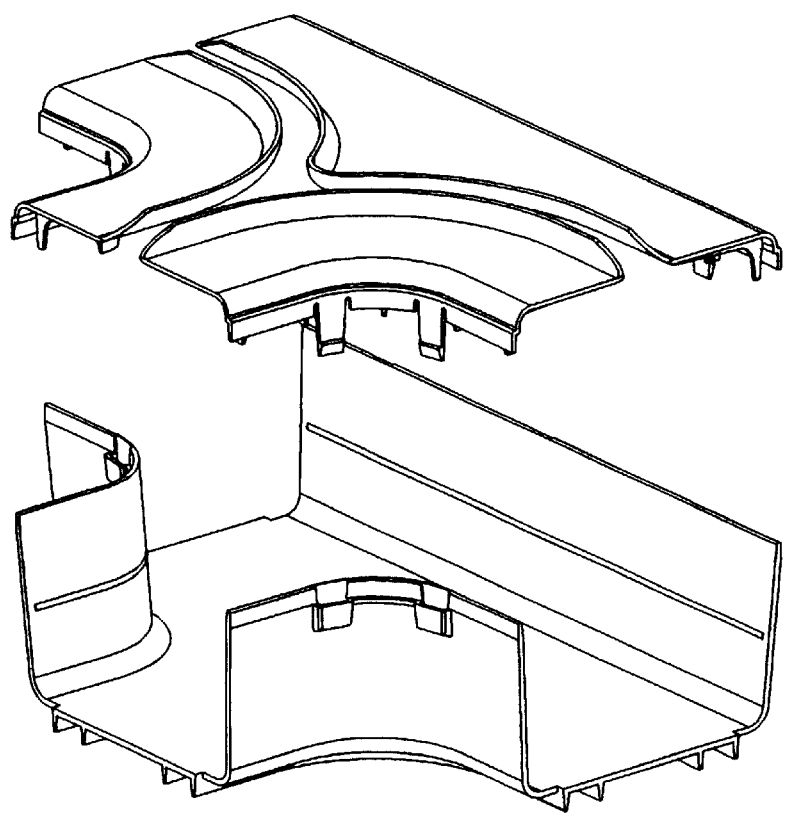
Figure 13:
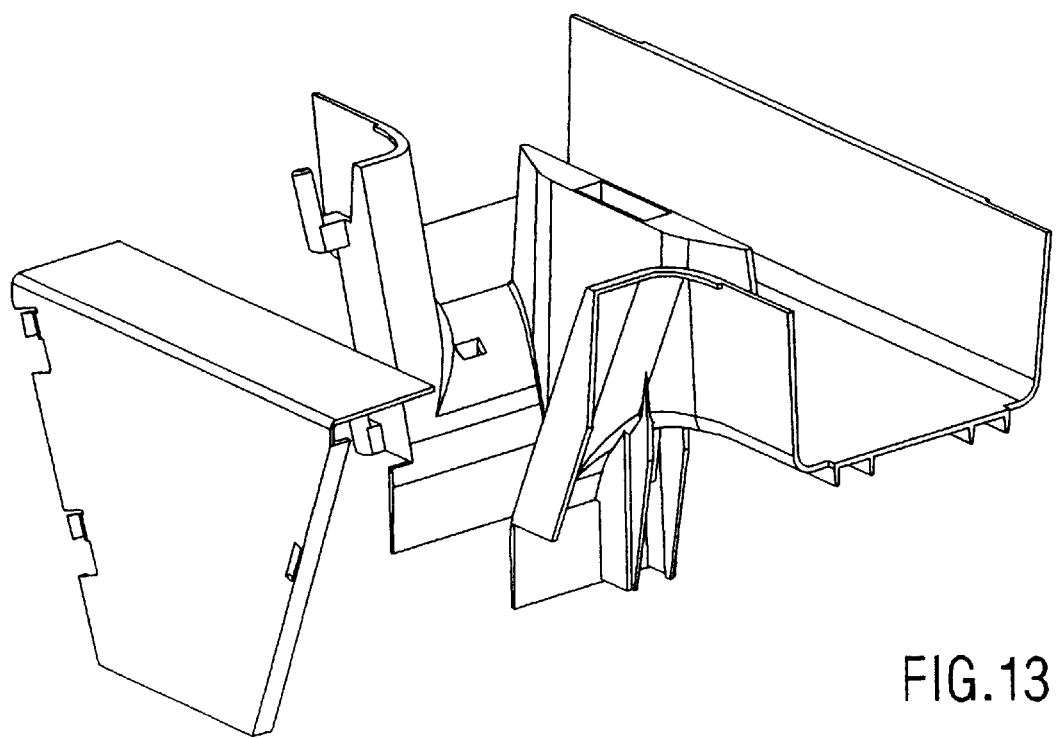

As better shown in FIGS. 2—3, the coupler 100 is shaped to correspond to and mate with duct sections 200. In the exemplary embodiments shown, the duct section and duct coupler are generally U-shaped. However, the invention is not limited to such shapes and may be formed from other shapes and configurations, i.e., circular, multi-sided, polygonal, etc., to form a cable receiving channel therebetween. The coupler can be formed from any rigid or semi-rigid material, such as metal or plastic. A preferred material is a molded or extruded plastic, such as acronitrile butadiene styrene (ABS).

The coupler 100 has an inner wall consisting of two side walls 110 and a bottom wall 120, which are preferably integral and continuous. A support rib 130 outwardly extends from the U-shaped inner wall and is substantially centrally disposed between forward and rearward edges 112, 114, respectively, of the inner wall. An axially extending outer wall 140 is formed on the support rib 130. Outer wall 140 is outwardly spaced from the inner wall 110, 120 by a predetermined amount to define a duct section receiving space 150 therebetween.

The outer wall 140 is preferably formed from a plurality of discontinuous outer wall portions, such as portions 140A–F shown. The discontinuous outer wall portions 140A–F form open spaces 170 therebetween. Alternatively, the open spaces 170 could be formed by cutting or forming openings in a continuous outer wall 140 sized to receive the retention clip 300. Within one or more of these open spaces, preferably at three of these open spaces (one on each of the side walls and bottom wall), a clip mount 180 is provided for attachment of retention clip 300. The mount clip 180 is preferably formed on the support rib 130.

The outer wall portions 140A–F also act as guide elements to guide and constrain the duct elements 200 coupled by the coupler 100. The outer wall portions 140A–F may be reinforced by reinforcing ribs 160 provided either axially, transversely or both on exterior surfaces of the wall portions 140A–F.

The retention clip 300 will be further described with reference to FIGS. 4–5. Retention clip 300 is preferably formed from a stamped metal or other resilient element and has arms 310 that are bent inward. Retention clip 300 is attached to duct coupler 100 by fastener 400, which attaches clip 300 to clip mount 180. Fastener 400 can be any conventional fastener, but is preferably a threaded bolt.

Once retention clip 300 is fully mounted on mounting clip 180, retention clip arms 310 extend into the duct receiving space 150 as shown in FIG. 5, with the arms 310 facing toward the central support rib 130. By this arrangement, an attachment end of duct element 200, such as a trough or fitting, is able to be relatively easily slid into the duct receiving space 150 in one direction and constrained by the side walls 110, the bottom wall 120 and the outer wall portions 140A–F. Moreover, the retention clip 300 provides a retention force acting on the attachment ends of the duct elements 200 to resist disassembly of the duct element 200 from the coupler 100 in an opposite direction. Most preferably, the retention force to resist disassembly is greater than the force to insert the duct element into the space 150.

The retention force is created by a mechanical spring bias inherent in the clip 300. By making the spring have arms 310 bent inward as shown, spring arms 310 are able to flex inwardly and allow the duct section to pass thereby in an insertion direction with minimal resistance. However, when the duct element is attempted to be removed in an opposite exit direction, the edges of the arms grab onto the duct section and the arms upon slight withdrawal of the duct section bend outwardly, which provides additional retention force onto the duct sections to resist further movement. This retention force can be increased by making the arms 310 of the clip have a sharpened or serrated edge that will bite into the duct element 200, particularly if the duct element is attempted to be removed. Retention can be further increased by providing pliable engagement ribs 250 on external walls of the duct section 200, which upon application of the retention force deform inward preventing slippage of the duct section past the spring arms 310 and inadvertent removal of the duct sections. Thus, continued force in the exit direction results in further outward bending of the arms, which wedges the duct section even tighter against the inner wall 110.

Thus, a duct system is provided that can be easily assembled and prevented from inadvertent disassembly with a simple, reliable structure. Preferably, the duct coupler is pre-installed with the retention clips 300 mounted in place on the clip mounts 180. This makes installation easier as all that is required is placement of the duct sections within the duct receiving space 150 of the duct coupler 100. Alternatively, the retention clips can be pre-installed in a partial mounting position where they are securely affixed to the clip mounts 180, but spaced in a retracted position such that the arms 310 are not within the duct receiving space 150. Then, upon full insertion of the duct sections into the space, the retention clips 300 can be fully tightened so that the arms 310 bias the duct section against the inner wall of the duct coupler.

The duct coupler 100 is still capable of easy removal when desired by simply removing fastener 400, such as by unthreading when the fastener is a threaded bolt. By doing this, the retention 300 and spring are removable from the duct receiving space so that the ducts 200 are freely removable from the coupler 100. In this regard, it may not be necessary for the retention clip 300 to be completely removed from duct coupler 100, but only sufficiently removed such that clip arms 310 are no longer within the duct receiving space 150. Thus, fastener 400 may permanently affix retention clip 300 onto the duct coupler 100, but may be provided with detents that allow the retention clip 300 to be moved between an inserted position and a withdrawn position.

It may be desirable to provide a cover 500, as shown in FIG. 4, to cover retention clip 300. Cover 500 should include a hole to receive fastener 400 therethrough. Alternatively, the cover 500 may include a fastener 400 molded or otherwise formed on an underside thereof, which can be inserted into mounting clip 180. As such, the fastener will not be exposed. In this latter example, a hole is not necessary.

The cover 500 supports the clip 300 so that an outward-facing surface of the retention clip 300 does not deform outward from the duct coupler 100 when force is applied to the retention clip 300. The cover 500 can be of the same material and color as duct coupler 100 for a pleasing aesthetic appearance. Alternatively, the cover 500 could be plastic coated and colored to match the duct coupler or painted to match.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A cable duct coupler for coupling discrete cable duct sections together without the need for tools, comprising:
    an inner wall shaped to define a cable-receiving channel therebetween, said inner wall having a predefined axial length between forward and rearward edges;
    a support rib outwardly extending from said inner wall, said support rib being substantially centrally disposed between the forward and rearward edges of said inner wall, said support rib including at least one clip mount;

an axially extending outer wall formed on said support rib, said axially extending outer wall being outwardly spaced from said inner wall by a predefined distance to define a duct section receiving space therebetween; and at least one removable retention clip matable with said clip mount through an open space provided in said outer wall, said retention clip having arms that extend into the duct section receiving space, wherein upon insertion of duct sections into said duct section receiving space, said at least one retention clip biases the duct sections against said inner wall to retain the duct sections together.

2. The cable duct coupler of claim 1, wherein said inner wall in generally U-shaped and consists of a bottom wall portion and two side wall portions.

3. The cable duct coupler of claim 2, wherein three retention clips are provided, one for each of said bottom wall portion and said two side walls portions.

4. The cable duct coupler of claim 1, wherein said axially extending outer wall is formed from a plurality of discrete outer wall portions forming said open space therebetween.

5. The cable duct coupler of claim 4, wherein said at least one retention clip and a corresponding said clip mount are provided at one or more of the open spaces.

6. The cable duct coupler of claim 1, wherein said at least one removable retention clip is movable between an insert position in which said arms extend into said duct section receiving space to allow coupling and a detach position in which said arms no longer extend into said duct section receiving space to allow disassembly of the discrete duct sections.

7. The cable duct coupler of claim 1, wherein said at least one retention clip is provided with a cover element.

8. The cable duct coupler of claim 1, wherein said at least one retention clip is mated with said clip mount by a fastener.

9. The cable duct coupler of claim 8, wherein said fastener is a threaded bolt.

10. The cable duct coupler of claim 8, wherein said at least one retention clip includes a hole through which said fastener passes to attach said at least one retention clip to said support rib.

11. The cable duct coupler of claim 10, further comprising a retention clip cover element provided with a hole, wherein said fastener passes through said hole to attach said at least one retention clip to said support rib.

12. The cable duct coupler of claim 1, wherein said at least one retention clip is formed of a resilient material and is bent to form arms that are angled towards said support rib of said duct coupler when installed.

13. The cable duct coupler of claim 1 wherein said resilient material is metal.

14. The cable duct coupler of claim 1, wherein each arm of the at least one retention clip is sharpened or serrated at an edge thereof to increase retention of the duct section with the coupler.

15. A cable duct system comprising the cable duct coupler of claim 1 and at least one duct section.

16. The cable duct system of claim 15, wherein said at least one duct section is a straight section of trough.

17. The cable duct system of claim 15, wherein said duct section is a fitting.

18. The cable duct system of claim 17, wherein said fitting is one of a corner fitting, a T-fitting, and an X-fitting.

19. The cable duct system of claim 15, wherein each arm of the at least one retention clip is sharpened or serrated at an edge thereof to increase retention of the duct section with the coupler.

20. The cable duct system of claim 19, wherein said at least one duct section includes at least one pliable engagement rib that is engaged by said arms.

* * * * *